(12) United States Patent
Li et al.

(10) Patent No.: US 8,923,834 B2
(45) Date of Patent: Dec. 30, 2014

(54) METHOD, SYSTEM AND BASE STATION FOR IMPLEMENTING COMPATIBILITY BETWEEN MOBILE CALL WAITING AND CLUSTER CALL WAITING

(75) Inventors: Baorui Li, Shenzhen (CN); Changrong Shi, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 356 days.

(21) Appl. No.: 13/581,623

(22) PCT Filed: Nov. 24, 2010

(86) PCT No.: PCT/CN2010/079091
§ 371 (c)(1),
(2), (4) Date: Aug. 29, 2012

(87) PCT Pub. No.: WO2011/140799
PCT Pub. Date: Nov. 17, 2011

(65) Prior Publication Data
US 2012/0322426 A1 Dec. 20, 2012

(30) Foreign Application Priority Data

May 11, 2010 (CN) .......................... 2010 1 0174789

(51) Int. Cl.
H04M 3/42 (2006.01)
H04B 7/00 (2006.01)
H04W 4/16 (2009.01)
H04M 3/428 (2006.01)

(52) U.S. Cl.
CPC ............ *H04W 4/16* (2013.01); *H04M 2207/18* (2013.01); *H04M 3/4288* (2013.01); *H04M 2203/2044* (2013.01)
USPC .......................................... 455/416; 455/518

(58) Field of Classification Search
CPC .................................. H04W 8/22; H04W 4/08

USPC ................................................ 455/416, 518
See application file for complete search history.

(56) References Cited

U.S. PATENT DOCUMENTS

| 6,990,353 B2 * | 1/2006 | Florkey et al. ................. 455/519 |
| 2003/0097466 A1 * | 5/2003 | Sung ............................. 709/238 |
| 2009/0215463 A1 * | 8/2009 | Satake .......................... 455/445 |

FOREIGN PATENT DOCUMENTS

| CN | 1874534 | 12/2006 |
| CN | 101001417 | 7/2007 |
| CN | 101835123 | 9/2010 |
| KR | 20070070676 | 7/2007 |

OTHER PUBLICATIONS

International Search Report for PCT/CN2010/079091, English translation attached to original, Both Completed by the Chinese Patent Office on Feb. 12, 2011, All together 6 Pages.

* cited by examiner

*Primary Examiner* — Marisol Figueroa
(74) *Attorney, Agent, or Firm* — Brooks Kushman P.C.

(57) ABSTRACT

A method, system and base station are disclosed for implementing compatibility between mobile call waiting and cluster call waiting. The method includes: when a first calling terminal initiates a first call, the base station receiving access information transmitted by a called terminal of the first call, and making a request to a mobile processor and a cluster processor for updating status information of terminals involved in the first call to a busy state; according to the request from the base station, the mobile processor and the cluster processor updating the status information of the terminals to the busy state; when a second calling terminal initiates a second call, the base station querying out that the status of the called terminal of the second call is busy, and transmitting call waiting incoming call prompting information to the called terminal of the second call.

18 Claims, 10 Drawing Sheets

METHOD, SYSTEM AND BASE STATION FOR IMPLEMENTING COMPATIBILITY BETWEEN MOBILE CALL WAITING AND CLUSTER CALL WAITING

CROSS-REFERENCE TO RELATED APPLICATION

This application is the U.S. national phase of PCT Appln. No. PCT/CN2010/079091 filed Nov. 24, 2010 which claims priority to Chinese Application No. 201010174789.4 filed May 11, 2010, the disclosures of which are incorporated in their entirety by reference herein.

TECHNICAL FIELD

The present invention relates to the communication technology, and in particular, to a method, system and base station for implementing compatibility between mobile call waiting and cluster call waiting.

BACKGROUND ART

A mobile system is provided with a function of call waiting, i.e., when the terminal receives a second call during a conversation, the terminal prompts the user that there is another incoming call. The prompting manner includes voice prompt and screen text prompt. In this case, the user only needs to press the answer key if he needs to connect the second call, and meanwhile, he can hold the first call connected. The user can switch to the first call if he presses the answer key again, and meanwhile keeps the second call connected, thereby achieving conversation switch between two calls by pressing the answer key.

A cluster system is provided with a function of incoming call prompt on busy. Similar to the call waiting function in the mobile system, when a terminal receives another cluster call when in a cluster conversation, the terminal prompts the user that there is another cluster incoming call. The prompting manner is voice prompt, and meanwhile related information such as the terminals of another cluster call and the cluster group number is displayed by way of screen text.

However, when a mobile system enters a cluster system, i.e., when the terminal has a mobile incoming call when in a cluster conversation; or when the terminal has a cluster incoming call when in a mobile conversation, the base station cannot know the status of the called terminals, and thus cannot send call waiting prompt information to the called terminals.

SUMMARY OF THE INVENTION

In view of the above, the main objective of the present invention is to provide a method, system and base station for implementing compatibility between mobile call waiting and cluster call waiting to ensure that when a terminal has a cluster call or a mobile call when in a mobile call or a cluster call, the base station can know the status of the called terminals, and sends call waiting incoming call prompt information to the called terminals.

In order to solve the above technical problem, the technical solution of the present invention is carried out as follows:

A method for implementing compatibility between mobile call waiting and cluster call waiting, comprising the following steps: when a first calling terminal initiates a first call, a base station receiving access information transmitted by a called terminal of the first call, and making a request to a mobile processor and a cluster processor for updating status information of terminals involved in the first call to a busy state; according to the request from the base station, the mobile processor and the cluster processor updating the status information of the terminals to the busy state; when a second calling terminal initiates a second call, the base station querying out that the status of the called terminal of the second call is busy, and transmitting call waiting incoming call prompting information to the called terminal of the second call.

The step of the base station making a request to a mobile processor and a cluster processor for updating status information of terminals involved in the first call to a busy state comprises: the base station making a request to the mobile processor and the cluster processor for updating the status information of the called terminal of the first call, or the status information of the called terminal of the first call and the first calling terminal to a busy state.

After the step of the base station transmitting call waiting incoming call prompting information to the called terminal of the second call, the method further comprises: the base station receiving call waiting incoming call access information transmitted by the called terminal of the second call, and making a request to the mobile processor and the cluster processor for updating the status information of the second calling terminal to a busy state; the mobile processor and the cluster processor updating the status information of the second calling terminal to a busy state according to the request of the base station.

After the step of the mobile processor and the cluster processor updating the status information of the calling terminals to a busy state, the method further comprises: the base station receiving ending call incoming call information, and making a request to the mobile processor and the cluster processor for updating the status information of the second calling terminal to be an idle state; the mobile processor and the cluster processor updating the status information of the second calling terminal to an idle state according to the request of the base station.

A system for implementing compatibility between mobile call waiting and cluster call waiting, comprising: a base station, a mobile processor and a cluster processor; wherein, the base station is used to, when a first calling terminal initiates a first call, receive access information transmitted by a called terminal of the first call, and make a request to the mobile processor and the cluster processor for updating status information of terminals involved in the first call to a busy state; and, when a second calling terminal initiates a second call, query out that the status of the called terminal of the second call is busy, and transmit call waiting incoming call prompting information to the called terminal of the second call;

the mobile processor and cluster processor are used to, according to the request from the base station, update the status information of the terminals to the busy state.

The base station is specifically used to, after receiving the access information transmitted by the called terminal of the first call, make a request to the mobile processor and the cluster processor for updating the status information of the called terminal of the first call, or the status information of the called terminal of the first call and the first calling terminal to a busy state.

The base station is further used to receive call waiting incoming call access information transmitted by the called terminal of the second call, and make a request to the mobile processor and the cluster processor for updating the status information of the second calling terminal to a busy state;

the mobile processor and the cluster processor are further used to update the status information of the second calling terminal to a busy state according to the request of the base station.

The base station is further used to receive ending call incoming call information, and make a request to the mobile processor and the cluster processor for updating the status information of the second calling terminal to be an idle state;

the mobile processor and the cluster processor are further used to update the status information of the second calling terminal to an idle state according to the request of the base station;

A base station for implementing compatibility between mobile call waiting and cluster call waiting, comprising a requesting module and a query module:

the requesting module is used to, when a first calling terminal initiates a first call, receive access information transmitted by a called terminal of the first call, and make a request to a mobile processor and a cluster processor for updating status information of terminals involved in the first call to a busy state;

the query module is used to, when a second calling terminal initiates a second call, query out that the status of the called terminal of the second call is busy, and transmit call waiting incoming call prompting information to the called terminal of the second call.

The requesting module is specifically used to, after receiving the access information transmitted by the called terminal of the first call, make a request to the mobile processor and the cluster processor for updating the status information of the called terminal of the first call, or the status information of the called terminal of the first call and the first calling terminal to a busy state.

The requesting module is further used to receive call waiting incoming call access information transmitted by the called terminal of the second call, and make a request to the mobile processor and the cluster processor for updating the status information of the second calling terminal to a busy state.

The requesting module is further used to receive ending call incoming call information, and make a request to the mobile processor and the cluster processor for updating the status information of the second calling terminal to be an idle state.

In the method, system and base station for implementing compatibility between mobile call waiting and cluster call waiting provided by the present invention, the status of the called terminal connected by the first call is updated to the busy state by the mobile processor and the cluster processor, and when the second calling terminal initiates the second call to the called terminal, the base station transmits the call waiting incoming call prompting information to the corresponding terminals based on the busy status of the called terminal which is queried out, thus enabling the compatibility between the mobile call waiting and the cluster call waiting.

SPECIFIC EMBODIMENTS

The implementation of the objective, the functional features and the advantages of the present invention will be further described with reference to the examples and drawings. It should be appreciated that the specific examples to be described here are only used to explain the present invention, rather than to limit the present invention.

Figure 1:
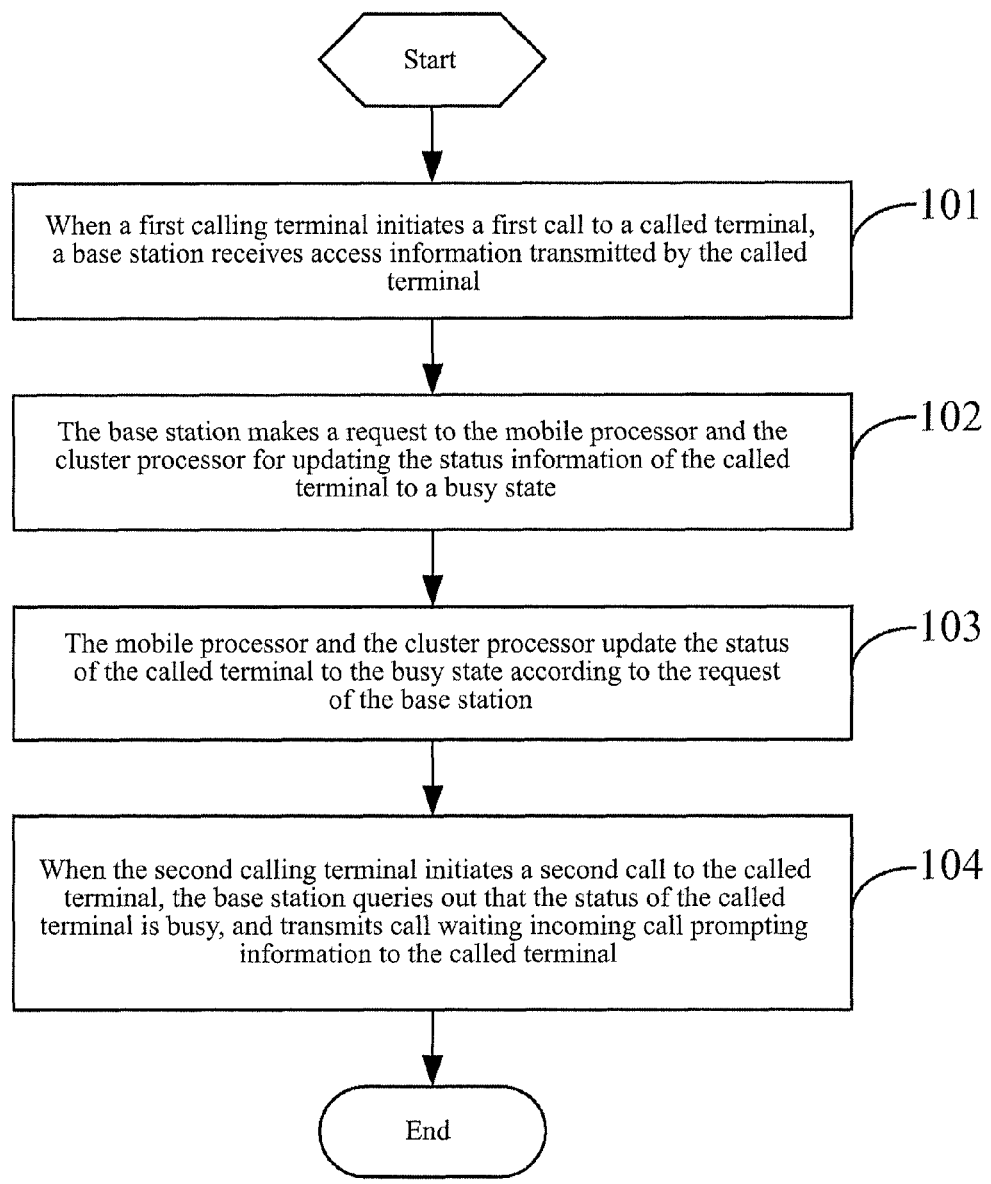
FIG. 1 is a flowchart of an example of the method for implementing compatibility between mobile call waiting and cluster call waiting according to the present invention.

Referring to FIG. 1, it shows an example of the method for implementing compatibility between mobile call waiting and cluster call waiting according to the present invention, which comprises the following steps.

In step 101, when a first calling terminal initiates a first call to a called terminal, a base station receives access information transmitted by the called terminal.

Figure 2:
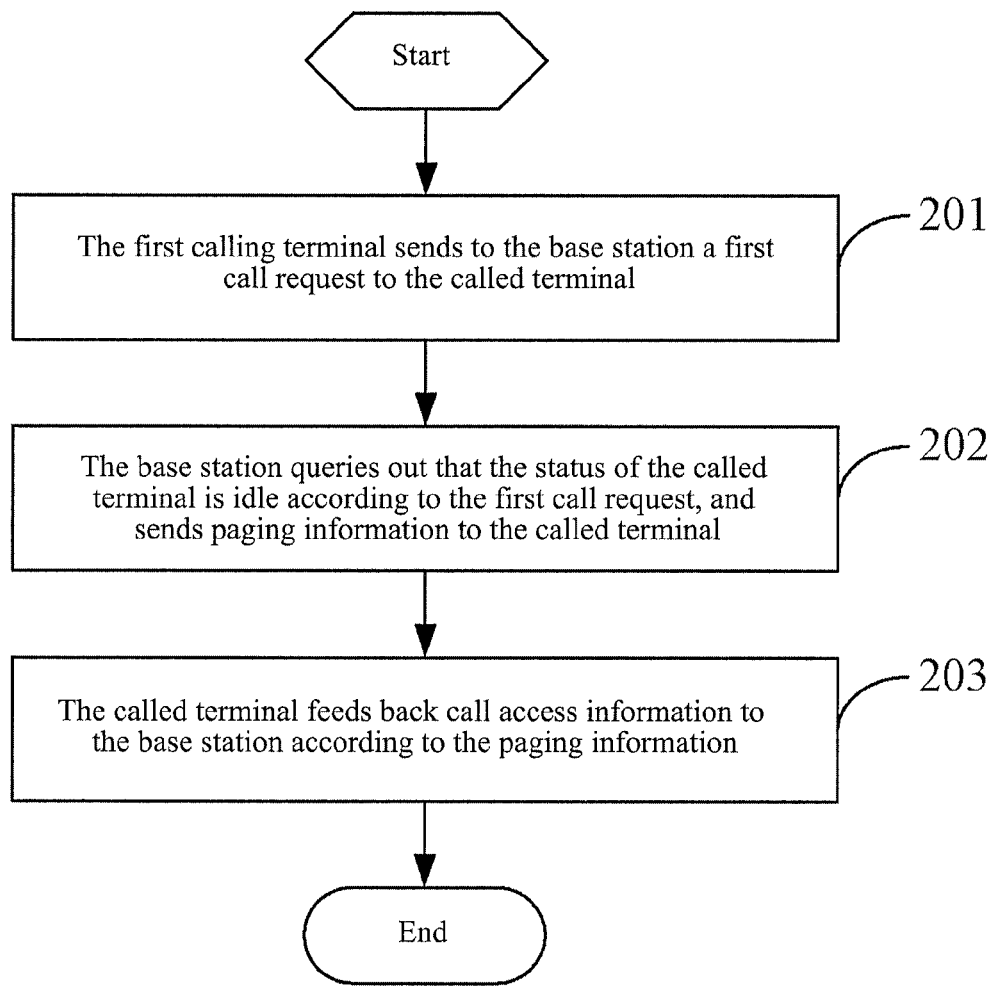
FIG. 2 is a specific flowchart of initiating a first call in an example of the method for implementing compatibility between mobile call waiting and cluster call waiting according to the present invention.

Referring to FIG. 2, the above step 101 specifically comprises the following steps.

In step 201, the first calling terminal sends to the base station a first call request to the called terminal.

The first call request to the called terminal sent by the first calling terminal to the base station includes two types: a mobile call request or a cluster call request, the call is a mobile call if the first call request is a mobile call request; the call is a cluster call if the first call request is a cluster call request.

In step 202, the base station queries out that the status of the called terminal is idle according to the first call request, and sends paging information to the called terminal.

In this step, when the first call request is a mobile call request, the base station queries the status of the called terminal from a mobile processor; when the first call request is a cluster call request, the base station queries the status of the called terminal from a cluster processor.

In step 203, the called terminal feeds back call access information to the base station according to the paging information.

At this moment, it suggests that the called terminal connects the call conversation with the first calling terminal, and the status of the called terminal changes from idle to busy.

In step 102, the base station makes a request to the mobile processor and the cluster processor for updating the status information of the called terminal to a busy state.

The base station simultaneously sends request information to the mobile processor and the cluster processor according to the change of the status of the called terminal to request for updating the status of the called terminal to the busy state.

In step 103, the mobile processor and the cluster processor update the status of the called terminal to the busy state according to the request of the base station.

After receiving the request information sent by the base station, the mobile processor and the cluster processor simultaneously update the status information of the called terminal to a busy state, so as to prepare for initiating a second call to the called terminal by the second calling terminal in the next step.

In step 104, when the second calling terminal initiates a second call to the called terminal, the base station queries out that the status of the called terminal is busy, and transmits call waiting incoming call prompting information to the called terminal.

In this step, no matter the first call is a mobile call or a cluster call, and no matter the second call is a mobile call or a cluster call, the base station can always query out that the status information of the called terminal is busy in the corresponding processor.

After receiving the call waiting incoming call prompting information, the called terminal can make the prompt via voice, or via screen text, or a combination thereof.

In this example, the statuses of the first calling terminal and the called terminal connected with the call are updated to the busy state by the mobile processor and the cluster processor, and when the second calling terminal initiates the second call to the corresponding terminals, the base station transmits the call waiting incoming call prompting information to the called terminal, thus implementing the function of compatibility between the mobile call waiting and the cluster call waiting.

Figure 3:
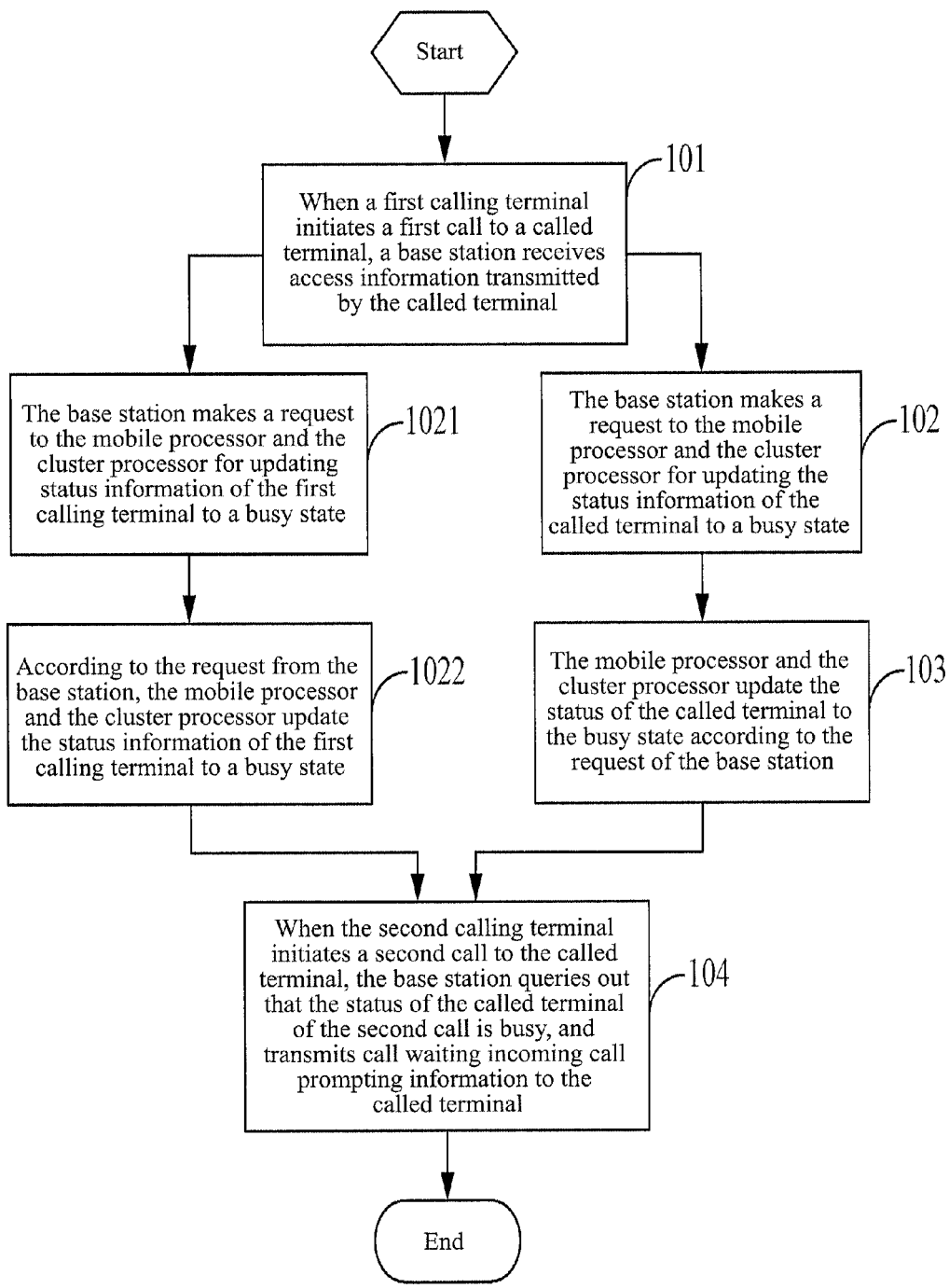
FIG. 3 is a flowchart of another example of the method for implementing compatibility between mobile call waiting and cluster call waiting according to the present invention.

Referring to FIG. 3, it shows another example of the method for implementing compatibility between mobile call waiting and cluster call waiting according to the present invention. In the above example, the method further comprises the following steps after the base station receiving access information transmitted by the called terminal.

In step 1021, the base station makes a request to the mobile processor and the cluster processor for updating status information of the first calling terminal to a busy state.

The base station receives access information transmitted by the called terminal, which suggests that the call between the first calling terminal and the called terminal is connected, the status of the first calling terminal is changed from idle to busy, and in order to update the status information of the terminals in the mobile processor and the cluster processor, the base station needs to send request information for updating the status information of the first calling terminal to the mobile processor and the cluster processor simultaneously to inform the mobile processor and the cluster processor to update the status information of the first calling terminal to a busy state.

In step 1022, according to the request from the base station, the mobile processor and the cluster processor update the status information of the first calling terminal to a busy state.

The mobile processor and the cluster processor receive the request information sent from the base station, and update the status information of the first calling terminal to a busy state according to the request information.

In this example, the status of the first calling terminal is updated, and when a terminal initiates a call to the first calling terminal, the base station can query out that the current status of the first calling terminal is busy, and then transmits the call waiting incoming call prompting information to the first calling terminal, thus implementing the function of compatibility between the mobile call waiting and the cluster call waiting.

Figure 4:
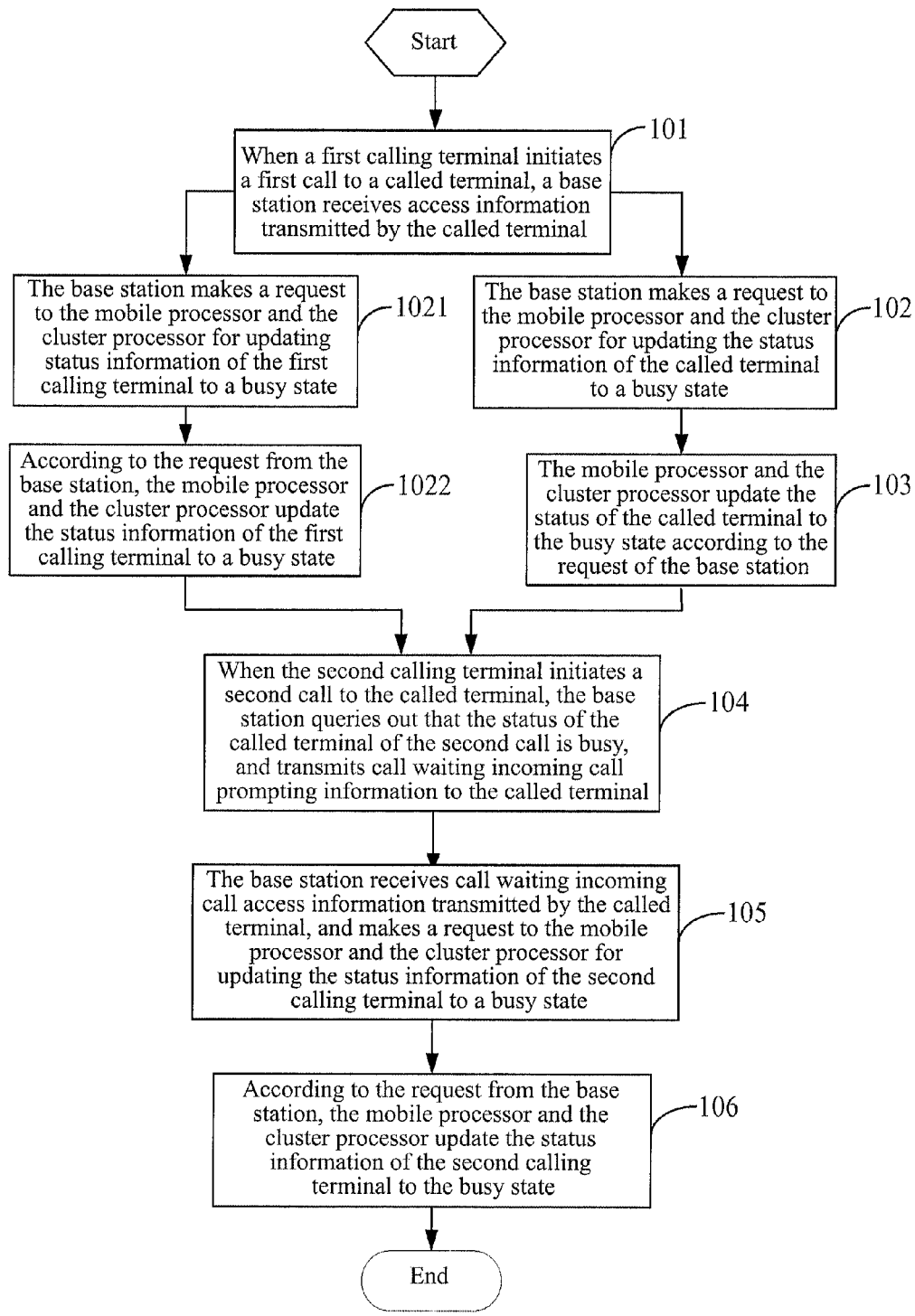
FIG. 4 is a flowchart of another example of the method for implementing compatibility between mobile call waiting and cluster call waiting according to the present invention.

Referring to FIG. 4, it shows another example of the method for implementing compatibility between mobile call waiting and cluster call waiting according to the present invention. The method further comprises the following steps after the base station sending the call waiting incoming call prompting information to the called terminal.

In step 105, the base station receives call waiting incoming call access information transmitted by the called terminal, and makes a request to the mobile processor and the cluster processor for updating the status information of the second calling terminal to a busy state.

In this step, after the base station receives call waiting incoming call access information, it suggests that the called terminal and the second calling terminal are connected by a call waiting incoming call conversation, and at this moment the status of the second calling terminal is changed from idle to busy, and the status of the called terminal does not change and remains busy, therefore, it only needs to update the status of the second calling terminal.

In addition, when the base station sends the call waiting incoming call prompting information to the called terminal, the called terminal may reject to connect the call waiting incoming call, at which moment, the called terminal sends connection rejection information to the base station, and the base station sends the connection rejection information to the second calling terminal.

Before the called terminal connects the call waiting incoming call, the second calling terminal may voluntarily end the incoming call conversation, at which moment the second calling terminal sends call waiting incoming call ending information to the base station, and the base station further sends the call waiting incoming call ending information to the called terminal, the called terminal ends the prompt for the call waiting incoming call according to the call waiting incoming call ending information.

In step 106, according to the request from the base station, the mobile processor and the cluster processor update the status information of the second calling terminal to the busy state.

In this example, the status of the second calling terminal is updated, and when a terminal initiates a call to the second calling terminal, the base station can query out that the current status of the second calling terminal is busy, and then transmits the call waiting incoming call prompting information to the second calling terminal, thus implementing the function of compatibility between the mobile call waiting and the cluster call waiting.

Figure 5:
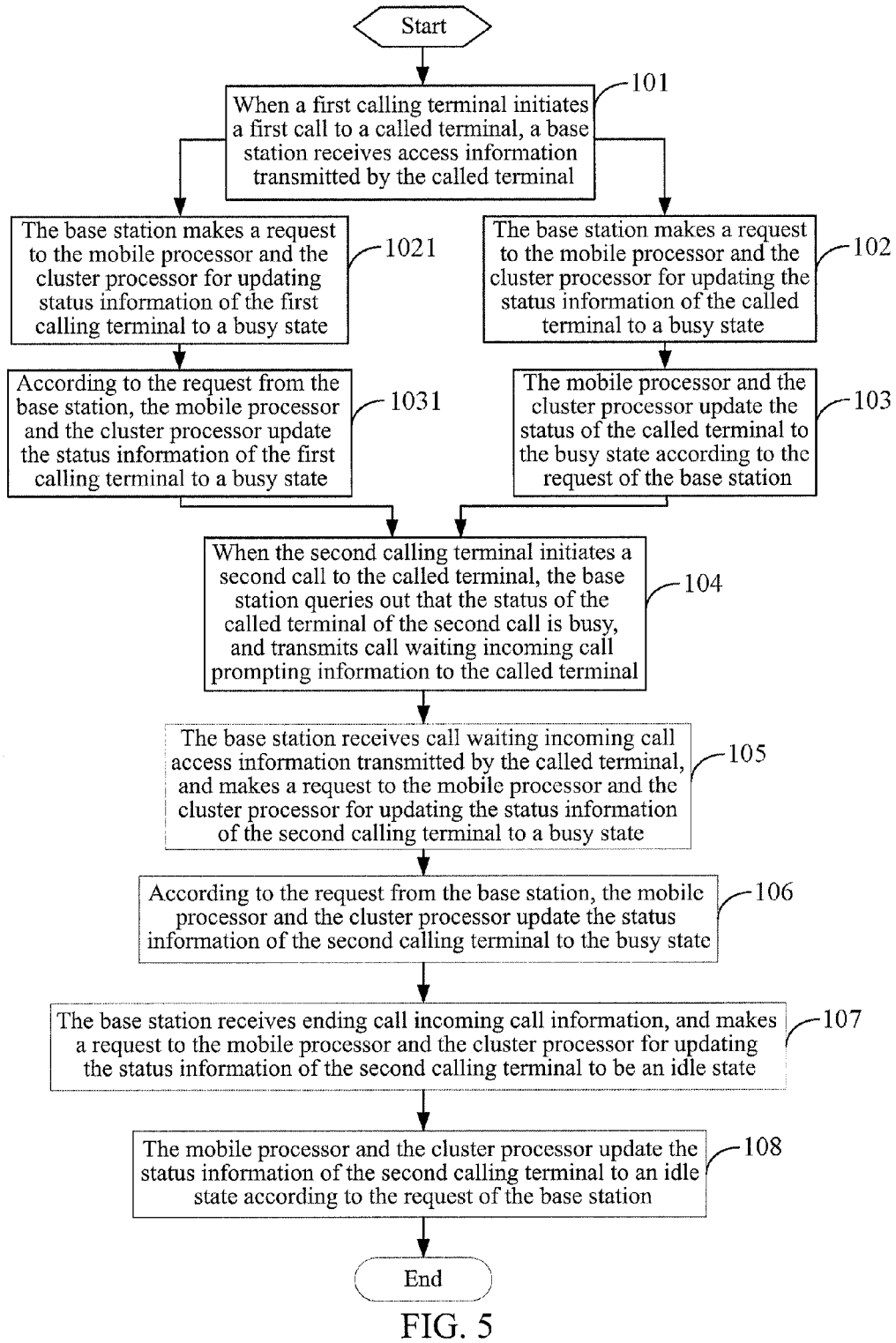
FIG. 5 is a flowchart of still another example of the method for implementing compatibility between mobile call waiting and cluster call waiting according to the present invention.

Referring to FIG. 5, it shows still another example of the method for implementing compatibility between mobile call waiting and cluster call waiting according to the present invention. The method further comprises the following steps after the step of the mobile processor and the cluster processor updating the status information of the second calling terminal to a busy state according to the request of the base station.

In step 107, the base station receives ending call incoming call information, and makes a request to the mobile processor and the cluster processor for updating the status information of the second calling terminal to be an idle state.

In this step, the ending call incoming call information received by the base station may be sent by the called terminal to the base station, or may be sent by the second calling terminal to the called terminal.

in step 108, the mobile processor and the cluster processor update the status information of the second calling terminal to an idle state according to the request of the base station.

In this example, when a second call is initiated to the called terminal, and the second call is a mobile call, the second incoming call is kept by the system, at which moment the user of the called terminal can press the answer key to connect the second call. If the second call is a cluster group call, after the user of the called terminal presses the answer key, the called terminal connects the second incoming call in a manner of active delay access. If the second call is a cluster single call, the second calling terminal holds the second call through the system, and the user of the called terminal presses the answer key to connect the second call.

In this example, the priorities of the mobile call and cluster call may also be set, for example, the priority of the mobile call can be configured to be higher than that of the cluster call, in which case, if the called terminal receives a mobile call when in a cluster call, it drops the cluster call conversation and sets up a mobile call. Meanwhile, the priority of the cluster call can also be configured to be higher than that of the mobile call, and if the called terminal is in a system with compatibility between mobile call waiting and cluster call waiting, it drops the mobile call conversation and sets up a cluster call after receiving the cluster call.

In this example, the involved mobile processor includes a mobile processing module and a mobile database; the cluster processor includes a cluster processing module and a cluster database. Wherein, the mobile processing module and the mobile database collectively implement the function of the mobile processor; the cluster processing module and the cluster database collectively implement the function of the cluster processor.

The below is the two specific flow examples of the second calling terminal initiating a second call to the called terminal according to the present invention.

Figure 6:
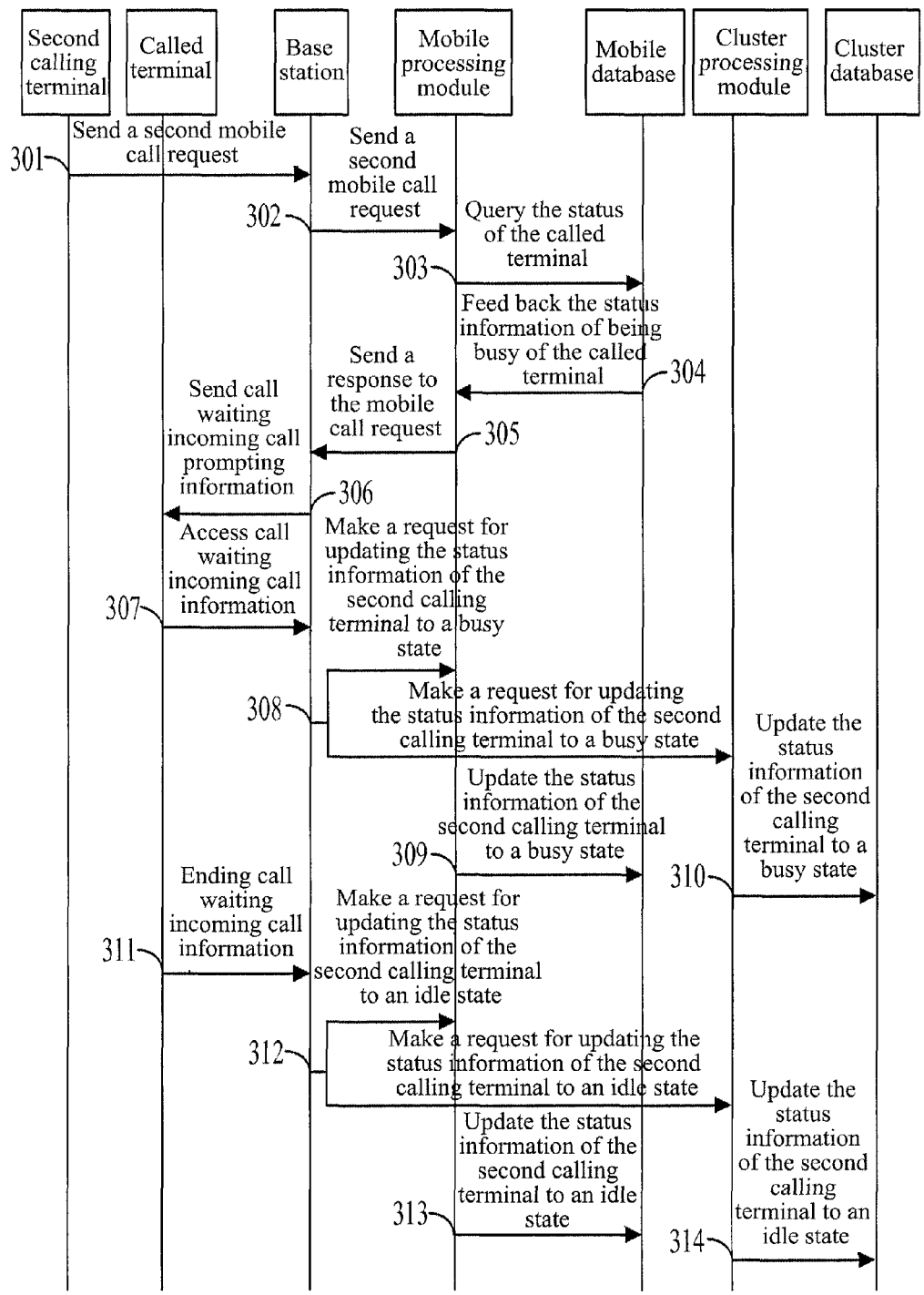
FIG. 6 is a flowchart of a specific example of initiating a second call to the called terminal according to the present invention.

One, the specific flow when the second call is a mobile call, as shown in FIG. 6, comprises the following steps.

In step 301, the second calling terminal sends to the base station a second mobile call request to the called terminal.

In step 302, the base station sends the received second mobile call request to the mobile processing module.

In step 303, the mobile processing module queries the status of the called terminal to the mobile database according to the second mobile call request.

In step 304, the mobile database feeds back the status information of being busy of the called terminal to the mobile processing module.

In step 305, the mobile processing module sends to the base station a response to the mobile call request, and feeds back the status information of being busy of the called terminal.

In step 306, the base station sends call waiting incoming call prompting information to the called terminal according to the response to the mobile call request.

After receiving the call waiting incoming call prompting information, the called terminal prompts via voice or screen text that there is a call waiting incoming call.

In step 307, the called terminal sends access call waiting incoming call information to the base station, at which moment, the second calling terminal changes from an idle state to a busy state.

In step 308, the base station makes request to the mobile processing module and the cluster processing module for updating the status information of the second calling terminal to a busy state.

In step 309, the mobile processing module updates the status information of the second calling terminal in the mobile database to a busy state according to the request.

In step 310, the cluster processing module updates the status information of the second calling terminal in the cluster database to a busy state according to the request.

In step 311, the called terminal sends ending call waiting incoming call information to the base station, and if the second calling terminal does not serve as a called terminal of another call during a call connecting process with the called terminal, the current status of the second calling terminal is changed from busy to idle.

The ending call waiting incoming call information being sent to the base station may also be implemented by the second calling terminal.

In step 312, the base station makes request to the mobile processing module and the cluster processing module for updating the status information of the second calling terminal to an idle state.

In step 313, the mobile processing module updates the status information of the second calling terminal in the mobile database to an idle state according to the request.

In step 314, the cluster processing module updates the status information of the second calling terminal in the cluster database to an idle state according to the request.

Figure 7:
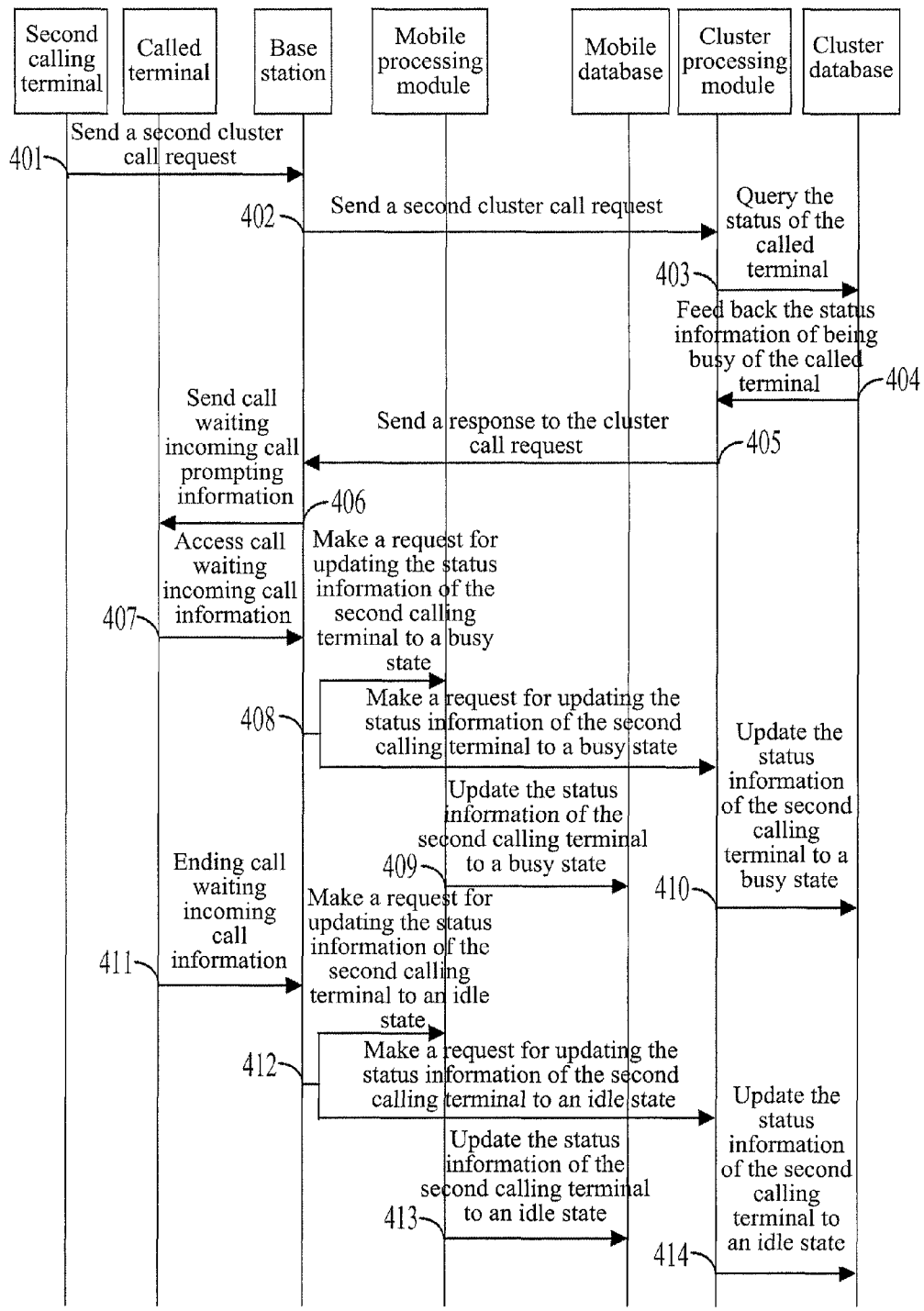
FIG. 7 is a flowchart of another specific example of initiating a second call to the called terminal according to the present invention.

Two, the specific flow where the second call is a cluster call, as shown in FIG. 7, comprises the following steps.

In step 401, the second calling terminal sends to the base station a second cluster call request to the called terminal.

In step 402, the base station sends the received second cluster call request to the cluster processing module.

In step 403, the mobile processing module queries the status of the called terminal to the cluster database according to the second cluster call request.

In step 404, the cluster database feeds back the status information of being busy of the called terminal to the cluster processing module.

In step 405, the cluster processing module sends to the base station a response to the cluster call request, and feeds back the status information of being busy of the called terminal.

In step 406, the base station sends call waiting incoming call prompting information to the called terminal according to the response to the cluster call request.

After receiving the call waiting incoming call prompting information, the called terminal prompts via voice or screen text that there is a call waiting incoming call.

In step 407, the called terminal sends access call waiting incoming call information to the base station, at which moment, the status of the second calling terminal changes from an idle state to a busy state.

In step 408, the base station makes request to the mobile processing module and the cluster processing module for updating the status information of the second calling terminal to a busy state.

In step 409, the mobile processing module updates the status information of the second calling terminal in the mobile database to a busy state according to the request.

In step 410, the cluster processing module updates the status information of the second calling terminal in the cluster database to a busy state according to the request.

In step 411, the called terminal sends ending call waiting incoming call information to the base station, and if the second calling terminal does not serve as a called terminal of another call during a call connecting process with the called terminal, the current status of the second calling terminal is changed from busy to idle.

The ending call waiting incoming call information being sent to the base station may also be implemented by the second calling terminal.

In step 412, the base station makes request to the mobile processing module and the cluster processing module for updating the status information of the second calling terminal to an idle state.

In step 413, the mobile processing module updates the status information of the second calling terminal in the mobile database to an idle state according to the request.

In step 414, the cluster processing module updates the status information of the second calling terminal in the cluster database to an idle state according to the request.

The below is the two specific flow examples of the first calling terminal initiating a first call to the called terminal according to the present invention.

Figure 8:
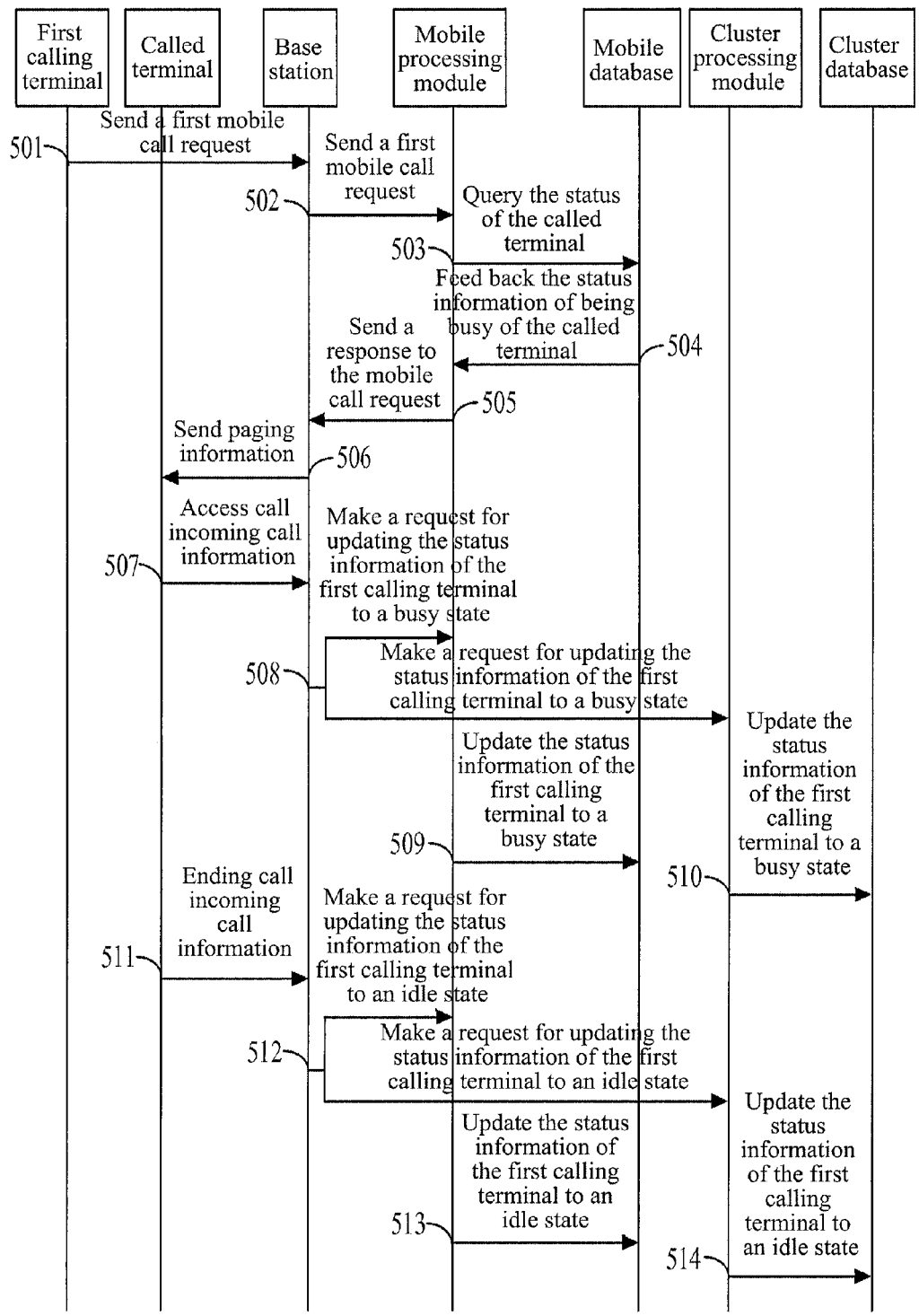
FIG. 8 is a flowchart of another specific example of initiating a first call to the called terminal according to the present invention.

One, the specific flow where the first call is a mobile call, as shown in FIG. 8, comprises the following steps.

In step 501, the first calling terminal sends to the base station a first mobile call request to the called terminal.

In step 502, the base station sends the received first mobile call request to the mobile processing module.

In step 503, the mobile processing module queries the status of the called terminal to the mobile database according to the first mobile call request.

In step 504, the mobile database feeds back the status information of being idle of the called terminal to the mobile processing module.

In step 505, the mobile processing module sends to the base station a response to the mobile call request, and feeds back the status information of being idle of the called terminal.

In step 506, the base station sends paging information to the called terminal according to the response to the mobile call request.

In step 507, the called terminal feeds back access call waiting incoming call information to the base station, at which moment, the first calling terminal and the called terminal change from an idle state to a busy state.

In step 508, the base station makes request to the mobile processing module and the cluster processing module for updating the status information of the first calling terminal and the called terminal to a busy state.

In step 509, the mobile processing module updates the status information of the first calling terminal and the called terminal in the mobile database to a busy state according to the request.

In step 510, the cluster processing module updates the status information of the first calling terminal and the called terminal in the cluster database to a busy state according to the request.

In step 511, the called terminal sends ending call waiting incoming call information to the base station, and if neither the first calling terminal nor the called terminal serve as a called terminal of other calls during a call connecting process, the current status of the first calling terminal and the called terminal is changed from busy to idle.

The ending call waiting incoming call information being sent to the base station may also be implemented by the first calling terminal.

In step 512, the base station makes request to the mobile processing module and the cluster processing module for updating the status information of the first calling terminal and the called terminal to an idle state.

In step 513, the mobile processing module updates the status information of the first calling terminal and the called terminal in the mobile database to an idle state according to the request.

In step 514, the cluster processing module updates the status information of the first calling terminal and the called terminal in the cluster database to an idle state according to the request.

Figure 9:
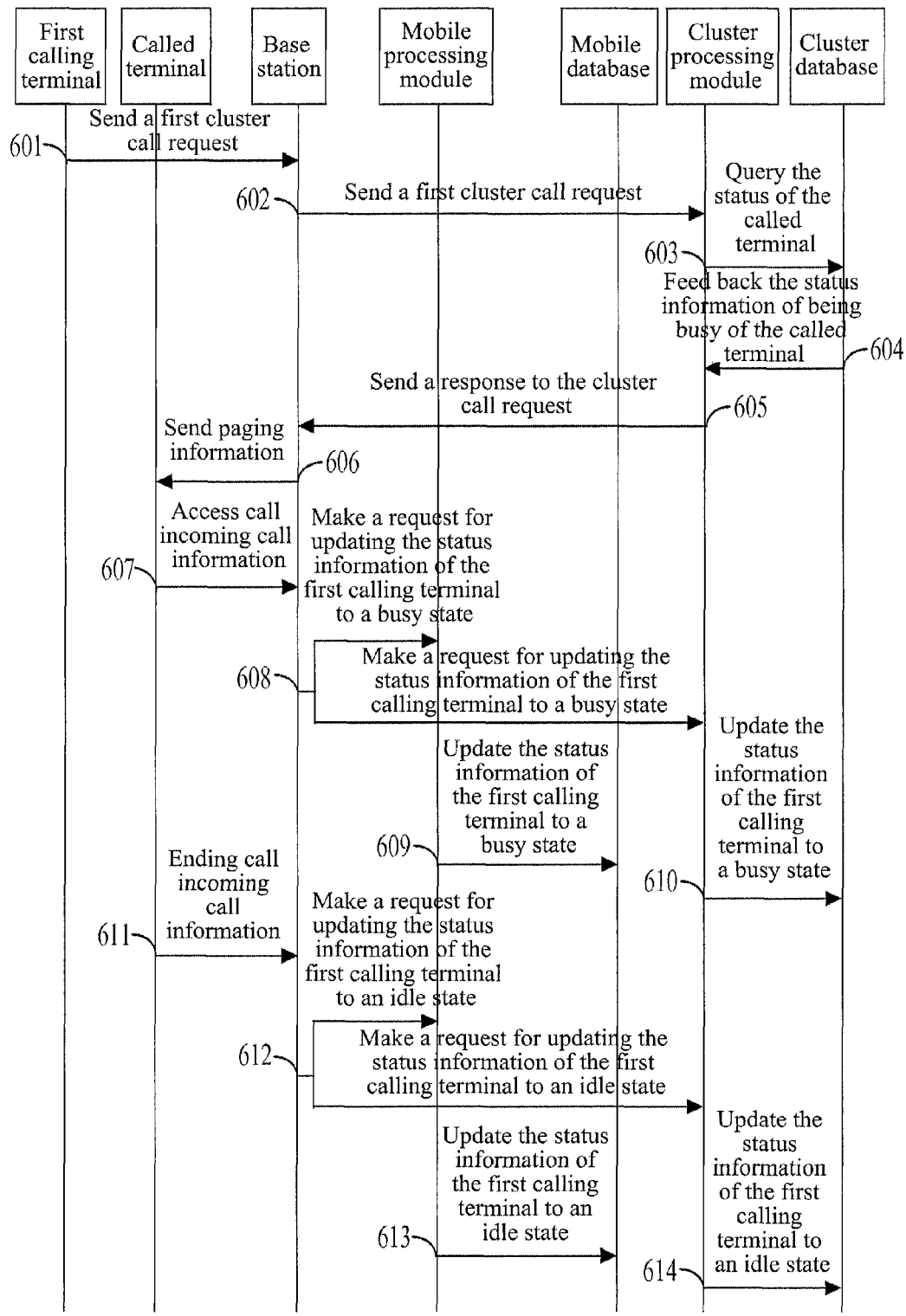
FIG. 9 is a flowchart of still another specific example of initiating a first call to the called terminal according to the present invention.

Two, the specific flow where the first call is a cluster call, as shown in FIG. 9, comprises the following steps.

In step 601, the first calling terminal sends to the base station a first cluster call request to the called terminal.

In step 602, the base station sends the received first cluster call request to the cluster processing module.

In step 603, the cluster processing module queries the status of the called terminal to the cluster database according to the first cluster call request.

In step 604, the cluster database feeds back the status information of being idle of the called terminal to the cluster processing module.

In step 605, the cluster processing module sends to the base station a response to the cluster call request, and feeds back the status information of being idle of the called terminal.

In step 606, the base station sends paging information to the called terminal according to the response to the cluster call request.

In step 607, the called terminal feeds back access call waiting incoming call information to the base station, at which moment, the called terminal and the first calling terminal change from an idle state to a busy state.

In step 608, the base station makes request to the mobile processing module and the cluster processing module for updating the status information of the called terminal and the first calling terminal to a busy state.

In step 609, the mobile processing module updates the status information of the called terminal and the first calling terminal in the mobile database to a busy state according to the request.

In step 610, the cluster processing module updates the status information of the called terminal and the first calling terminal in the cluster database to a busy state according to the request.

In step 611, the called terminal sends ending call waiting incoming call information to the base station, and if neither the first calling terminal nor the called terminal serve as a called terminal of other calls during a call connecting process, the current status of the called terminal and the first calling terminal is changed from busy to idle.

The ending call waiting incoming call information being sent to the base station may also be implemented by the first calling terminal;

In step 612, the base station makes request to the mobile processing module and the cluster processing module for updating the status information of the first calling terminal and the called terminal to an idle state.

In step 613, the mobile processing module updates the status information of the first calling terminal and the called terminal in the mobile database to an idle state according to the request.

In step 614, the cluster processing module updates the status information of the first calling terminal and the called terminal in the cluster database to an idle state according to the request.

Figure 10:
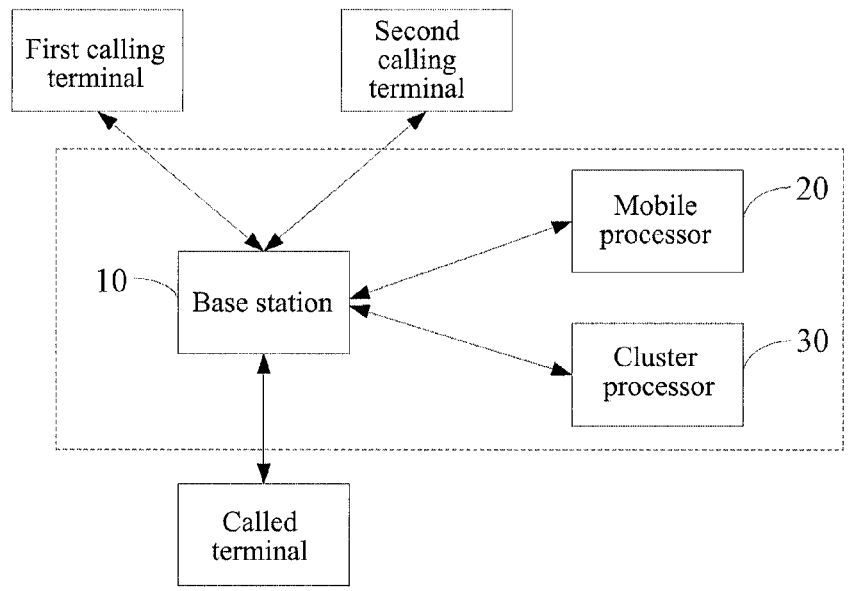
FIG. 10 illustrates the structure of the system for implementing compatibility between mobile call waiting and cluster call waiting according to the present invention.

An example of the system for implementing compatibility between mobile call waiting and cluster call waiting, as shown in FIG. 10, comprises a base station 10, a mobile processor 20 and a cluster processor 30. Wherein, the base station 10 is used to, when a first calling terminal initiates a first call, receive access information transmitted by a called terminal of the first call, and make a request to the mobile processor 20 and the cluster processor 30 for updating status information of terminals involved in the first call to a busy state; and, when a second calling terminal initiates a second call, query out that the status of the called terminal of the second call is busy, and transmit call waiting incoming call prompting information to the called terminal of the second call;

the mobile processor 20 and cluster processor 30 are used to, according to the request from the base station 10, update the status information of the terminals to the busy state.

In this example, the statuses of the terminals connected by the first call are updated to the busy state by the mobile processor 20 and the cluster processor 30, and when the second calling terminal initiates the second call to the corresponding terminals, the base station transmits the call waiting incoming call prompting information to the corresponding terminals, thus enabling the compatibility between the mobile call waiting and the cluster call waiting.

Furthermore, the above base station 10 is specifically used to, after receiving the access information transmitted by the called terminal of the first call, make a request to the mobile processor 20 and the cluster processor 30 for updating the status information of the called terminal of the first call, or the status information of the called terminal of the first call and the first calling terminal to a busy state; the mobile processor 20 and cluster processor 30 are used to, according to the request from the base station 10, update the status information of the called terminal of the first call, or the status information of the called terminal of the first call and the first calling terminal to a busy state.

Furthermore, the base station 10 is further used to receive call waiting incoming call access information transmitted by the called terminal of the second call, and make a request to the mobile processor 20 and the cluster processor 30 for updating the status information of the second calling terminal to a busy state; the mobile processor 20 and the cluster processor 30 are further used to update the status information of the second calling terminal to a busy state according to the request of the base station 10.

Furthermore, the base station 10 is further used to, after the mobile processor 20 and the cluster processor 30 update the status information of the second calling terminal to a busy state according to the request of the base station 10, receive ending call incoming call information, and make a request to the mobile processor 20 and the cluster processor 30 for updating the status information of the second calling terminal to be an idle state; the mobile processor 20 and the cluster processor 30 are further used to update the status information of the second calling terminal to an idle state according to the request of the base station 10.

Figure 11:
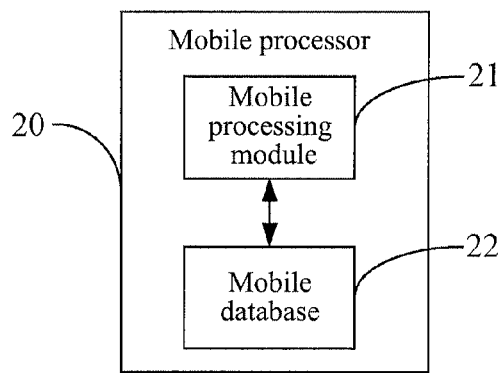
FIG. 11 illustrates the structure of the mobile processor of the system for implementing compatibility between mobile call waiting and cluster call waiting according to the present invention.

Furthermore, see FIG. 11, the above mobile processor 20 may be composed of a mobile processing module 21 and a mobile database 22. The mobile processing module 21 is used to update the status information of the called terminal, or the status information of the first calling terminal and the called terminal, or the status information of the called terminal, the first calling terminal and the second calling terminal in the mobile database 22 according to the request of the base station 10; and is used to query the status of the called terminal in the mobile database 22 according to the mobile call request sent from the base station 10, and feed back the queried status information of the called terminal to the base station 10.

The mobile database 22 is used to store the status information of the called terminal, or the status information of the first calling terminal and the called terminal, or the status information of the called terminal, the first calling terminal and the second calling terminal, and feed back the status information of the called terminal to the mobile processing module 21 according to the query of the mobile processing module 21.

Figure 12:
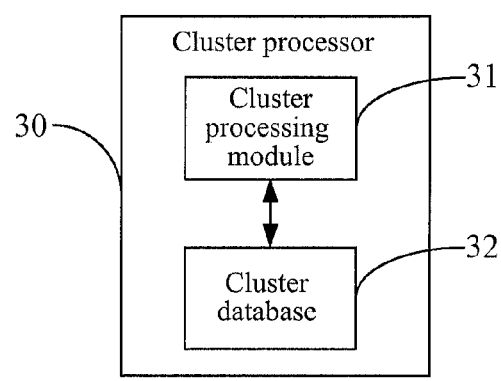
FIG. 12 illustrates the structure of the cluster processor of the system for implementing compatibility between mobile call waiting and cluster call waiting according to the present invention.

Furthermore, see FIG. 12, the above cluster processor 30 may be composed of a cluster processing module 31 and a cluster database 32. The cluster processing module 31 is used to update the status information of the called terminal, or the status information of the first calling terminal and the called terminal, or the status information of the called terminal, the first calling terminal and the second calling terminal in the cluster database 32 according to the request of the base station 10; and is used to query the status of the called terminal in the cluster database 32 according to the cluster call request sent from the base station 10, and feed back the queried status information of the called terminal to the base station 10.

The cluster database 32 is used to store the status information of the called terminal, or the status information of the first calling terminal and the called terminal, or the status information of the called terminal, the first calling terminal and the second calling terminal, and feed back the status information of the called terminal to the cluster processing module 31 according to the query of the cluster processing module 31.

See FIG. 10, in an example of the base station 10 for implementing compatibility between mobile call waiting and cluster call waiting according to the present invention, the base station 10 comprises a requesting module and a query module, wherein, the requesting module is used to, when a first calling terminal initiates a first call, receive access information transmitted by a called terminal of the first call, and make a request to the mobile processor 20 and the cluster processor 30 for updating status information of terminals involved in the first call to a busy state; the query module is used to, when a second calling terminal initiates a second call, query out that the status of the called terminal of the second call is busy, and transmit call waiting incoming call prompting information to the called terminal of the second call.

In this example, the statuses of the terminals connected by the first call are updated to the busy state through making a request to the mobile processor 20 and the cluster processor 30 by the base station, and when the second calling terminal initiates the second call to the corresponding terminals, the base station transmits the call waiting incoming call prompting information to the corresponding terminals, thus enabling the compatibility between the mobile call waiting and the cluster call waiting.

Furthermore, the requesting module of the above bases station 10 is specifically used to, after receiving the access information transmitted by the called terminal of the first call, make a request to the mobile processor 20 and the cluster processor 30 for updating the status information of the called terminal of the first call, or the status information of the called terminal of the first call and the first calling terminal to a busy state.

Furthermore, the requesting module of the above bases station 10 is further used to receive call waiting incoming call access information transmitted by the called terminal of the second call, and make a request to the mobile processor 20 and the cluster processor 30 for updating the status information of the second calling terminal to a busy state. Furthermore, the requesting module of the above bases station 10 is further used to receive ending call incoming call information, and make a request to the mobile processor 20 and the cluster processor 30 for updating the status information of the second calling terminal to be an idle state.

It should be appreciated that the above examples are only preferred examples of the present invention, and are not thus used to limit the patent scope of the present invention. Any equivalent structure or equivalent flow change made based on the description and contents of the drawings of the present invention, or direct or indirect application in other related technical fields, shall fall into the patent protection scope of the present invention.

What is claimed:

1. A method for implementing compatibility between mobile call waiting and cluster call waiting, comprising the following steps:
    when a first calling terminal initiates a first call, a base station receiving access information transmitted by a called terminal of the first call;
    the base station making a request to a mobile processor and a cluster processor for updating status information of terminals involved in the first call to a busy state;
    according to the request from the base station, the mobile processor and the cluster processor updating the status information of the terminals to the busy state;
    when a second calling terminal initiates a second call, the base station querying out that the status of the called terminal of the second call is busy, and transmitting call waiting incoming call prompting information to the called terminal of the second call.

2. The method according to claim 1, wherein, the step of the base station making a request to a mobile processor and a cluster processor for updating status information of terminals involved in the first call to a busy state comprises:
    the base station making a request to the mobile processor and the cluster processor for updating the status information of the called terminal of the first call, or the status information of the called terminal of the first call and the first calling terminal to a busy state.

3. The method according to claim 1, wherein, after the step of the base station transmitting call waiting incoming call prompting information to the called terminal of the second call, the method further comprises:
    the base station receiving call waiting incoming call access information transmitted by the called terminal of the second call, and making a request to the mobile processor and the cluster processor for updating the status information of the second calling terminal to a busy state;
    the mobile processor and the cluster processor updating the status information of the second calling terminal to a busy state according to the request of the base station.

4. The method according to claim 3, wherein, after the step of the mobile processor and the cluster processor updating the status information of the calling terminals to a busy state, the method further comprises:
    the base station receiving ending call incoming call information, and making a request to the mobile processor and the cluster processor for updating the status information of the second calling terminal to be an idle state;
    the mobile processor and the cluster processor updating the status information of the second calling terminal to an idle state according to the request of the base station.

5. The method according to claim 2, wherein, after the step of the base station transmitting call waiting incoming call prompting information to the called terminal of the second call, the method further comprises:
    the base station receiving call waiting incoming call access information transmitted by the called terminal of the second call, and making a request to the mobile processor and the cluster processor for updating the status information of the second calling terminal to a busy state;
    the mobile processor and the cluster processor updating the status information of the second calling terminal to a busy state according to the request of the base station.

6. The method according to claim 5, wherein, after the step of the mobile processor and the cluster processor updating the status information of the calling terminals to a busy state, the method further comprises:
    the base station receiving ending call incoming call information, and making a request to the mobile processor and the cluster processor for updating the status information of the second calling terminal to be an idle state;
    the mobile processor and the cluster processor updating the status information of the second calling terminal to an idle state according to the request of the base station.

7. A system for implementing compatibility between mobile call waiting and cluster call waiting, comprising: a base station, a mobile processor and a cluster processor; wherein,
    the base station is used to, when a first calling terminal initiates a first call, receive access information transmitted by a called terminal of the first call, and make a request to the mobile processor and the cluster processor for updating status information of terminals involved in the first call to a busy state; and, when a second calling terminal initiates a second call, query out that the status of the called terminal of the second call is busy, and transmit call waiting incoming call prompting information to the called terminal of the second call;
    the mobile processor and cluster processor are used to, according to the request from the base station, update the status information of the terminals to the busy state.

8. The system according to claim 7, wherein, the base station is specifically used to, after receiving the access information transmitted by the called terminal of the first call, make a request to the mobile processor and the cluster processor for updating the status information of the called terminal of the first call, or the status information of the called terminal of the first call and the first calling terminal to a busy state.

9. The system according to claim 7, wherein, the base station is further used to receive call waiting incoming call access information transmitted by the called terminal of the second call, and make a request to the mobile processor and the cluster processor for updating the status information of the second calling terminal to a busy state;
    the mobile processor and the cluster processor are further used to update the status information of the second calling terminal to a busy state according to the request of the base station.

10. The system according to claim 9, wherein,
    the base station is further used to receive ending call incoming call information, and make a request to the mobile processor and the cluster processor for updating the status information of the second calling terminal to be an idle state;

the mobile processor and the cluster processor are further used to update the status information of the second calling terminal to an idle state according to the request of the base station.

11. The system according to claim 8, wherein, the base station is further used to receive call waiting incoming call access information transmitted by the called terminal of the second call, and make a request to the mobile processor and the cluster processor for updating the status information of the second calling terminal to a busy state;

the mobile processor and the cluster processor are further used to update the status information of the second calling terminal to a busy state according to the request of the base station.

12. The system according to claim 11, wherein, the base station is further used to receive ending call incoming call information, and make a request to the mobile processor and the cluster processor for updating the status information of the second calling terminal to be an idle state;

the mobile processor and the cluster processor are further used to update the status information of the second calling terminal to an idle state according to the request of the base station.

13. A base station for implementing compatibility between mobile call waiting and cluster call waiting, comprising a requesting module and a query module:

the requesting module is used to, when a first calling terminal initiates a first call, receive access information transmitted by a called terminal of the first call, and make a request to a mobile processor and a cluster processor for updating status information of terminals involved in the first call to a busy state;

the query module is used to, when a second calling terminal initiates a second call, query out that the status of the called terminal of the second call is busy, and transmit call waiting incoming call prompting information to the called terminal of the second call.

14. The base station according to claim 13, wherein, the requesting module is specifically used to, after receiving the access information transmitted by the called terminal of the first call, make a request to the mobile processor and the cluster processor for updating the status information of the called terminal of the first call, or the status information of the called terminal of the first call and the first calling terminal to a busy state.

15. The base station according to claim 13, wherein, the requesting module is further used to receive call waiting incoming call access information transmitted by the called terminal of the second call, and make a request to the mobile processor and the cluster processor for updating the status information of the second calling terminal to a busy state.

16. The base station according to claim 15, wherein, the requesting module is further used to receive ending call incoming call information, and make a request to the mobile processor and the cluster processor for updating the status information of the second calling terminal to be an idle state.

17. The base station according to claim 14, wherein, the requesting module is further used to receive call waiting incoming call access information transmitted by the called terminal of the second call, and make a request to the mobile processor and the cluster processor for updating the status information of the second calling terminal to a busy state.

18. The base station according to claim 17, wherein, the requesting module is further used to receive ending call incoming call information, and make a request to the mobile processor and the cluster processor for updating the status information of the second calling terminal to be an idle state.

* * * * *